April 3, 1956 G. T. JACOBI ET AL 2,740,584

SIMULTANEOUS LINEAR EQUATION COMPUTER

Filed Dec. 20, 1952 4 Sheets-Sheet 1

Inventors:
George T. Jacobi,
Herman D. Parks,
by
Their Attorney.

Inventors:
George T. Jacobi,
Herman D. Parks,
by Paul A. Frank
Their Attorney.

SIMULTANEOUS LINEAR EQUATION COMPUTER

Filed Dec. 20, 1952 4 Sheets-Sheet 3

Inventors:
George T. Jacobi,
Herman D. Parks,
by Paul A. Frank
Their Attorney.

April 3, 1956 G. T. JACOBI ET AL 2,740,584

SIMULTANEOUS LINEAR EQUATION COMPUTER

Filed Dec. 20, 1952 4 Sheets-Sheet 4

Inventors:
George T. Jacobi,
Herman D. Parks,
by Paul A. Frank
Their Attorney.

United States Patent Office 2,740,584

Patented Apr. 3, 1956

2,740,584

SIMULTANEOUS LINEAR EQUATION COMPUTER

George Thomas Jacobi and Herman D. Parks, Schenectady, N. Y., assignors to General Electric Company, a corporation of New York Application December 20, 1952, Serial No. 327,083

10 Claims. (Cl. 235—61)

Figures 1, 2:
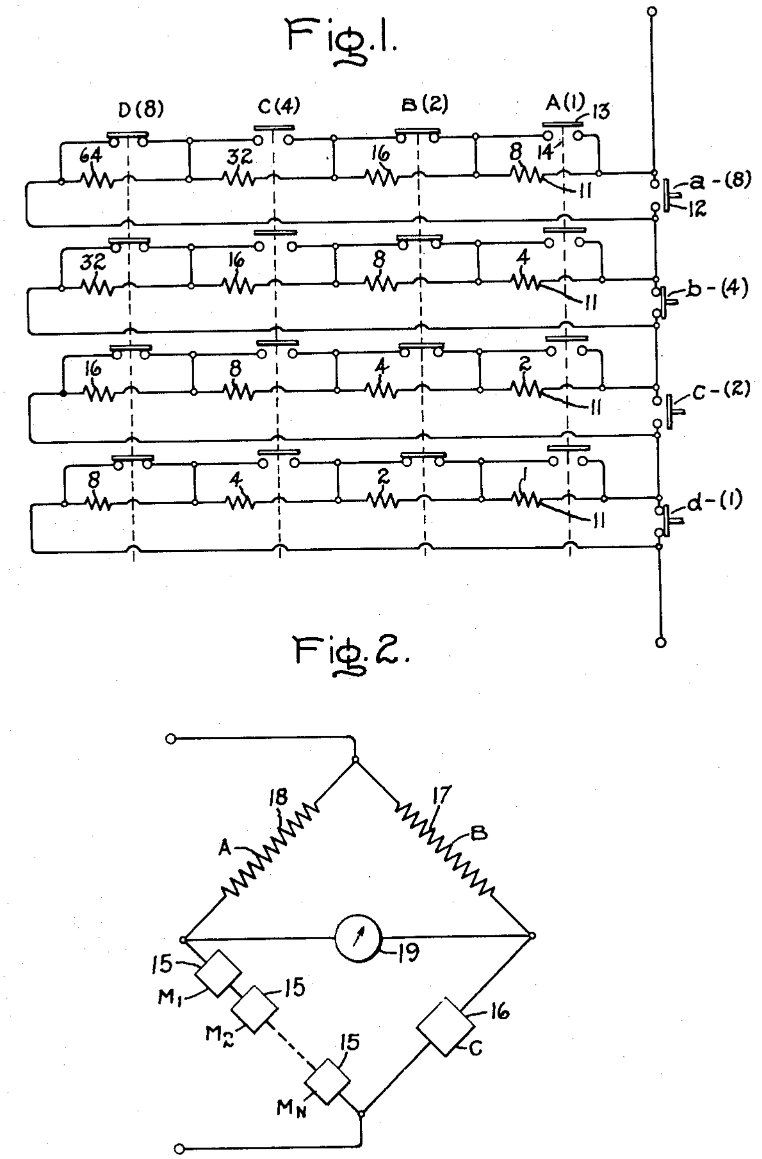

The present invention relates to an electrical computer.

More specifically, the invention relates to electrical computers of the analog type for solving sets of simultaneous linear equations. This invention relates to a computer system which may utilize various multiplying networks. Two forms of the multiplying network which are particularly well suited for use in the computer system are described in detail herein and illustrated by Figs. 1 and 4 of this application. These forms of the multiplying network are disclosed and claimed in the application of Herman D. Parks, Serial No. 323,915, filed December 3, 1952, and assigned to the assignee of the present application.

Sets of simultaneous linear equations are quite often encountered in a great many fields of physical investigation, and are particularly numerous in problems of analysis wherein mass spectrometers or infrared spectrophotometers are used. Because such sets of equations do arise quite frequently, it is desirable that some means be provided for quickly computing the solutions of the equations developed during an investigation. There are some known computers available for accomplishing this job; however, such computers have not been entirely satisfactory, and hence have not come into widespread use. To be suitable for most applications, it is desirable that the computer be somewhat automatic in operation so that it does not require too much attention on the part of an operator after a problem has been set up in the machine. The computer should be capable of solving sets of equations by a number of different computation techniques, it should be so designed that the time required to enter a problem into the machine is reduced to a minimum, and must further provide highly accurate and reliable results. It is also desirable that the computer be relatively inexpensive to construct, and simple in design.

It is therefore one object of the present invention to provide a simultaneous linear equation computer which is semi or fully automatic in operation so that it requires little or no attention on the part of an operator once a problem has been entered into the machine.

Another object of the invention is to provide a simultaneous linear equation computer capable of solving problems by a number of different mathematical computation techniques.

Still another object of the invention is to provide a simultaneous linear equation computer which reduces the time required to set up problems in the machine to a minimum since it employs a punched card switching mechanism for entering the matrices of coefficients into the machine.

A further object of the invention is to provide a computer of the analog type for use with sets of simultaneous linear equations which incorporates the simplicity of design of the analog type computer, but is nevertheless highly accurate in that it employs the step-by-step computation methods common to digital type computers.

A still further object of the invention is to provide a simultaneous linear equation computer incorporating all of the above-listed advantages, which is relatively simple in design, and inexpensive to manufacture.

In carrying out the above-listed objects of the invention, an electrical computer is provided which comprises a Wheatstone bridge circuit having a multiplying network connected in a first branch thereof. A variable impedance is connected in the second branch of the Wheatstone bridge circuit adjacent to the first-mentioned branch, a constant impedance is connected in each of the remaining two branches of the circuit, and an indicator means is connected across diagonally opposite terminals of the bridge thus formed.

Figure 3:
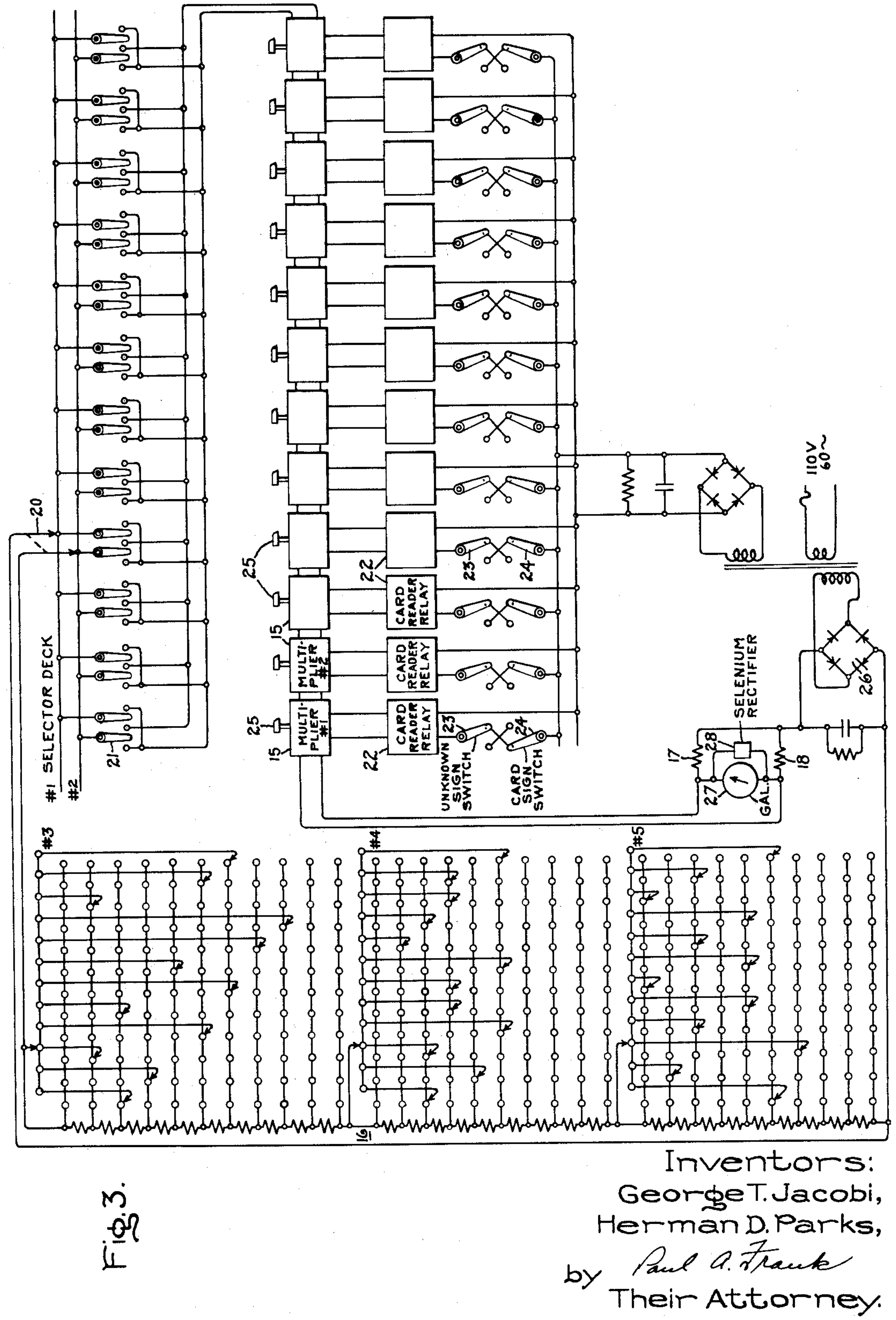
Figure 4:
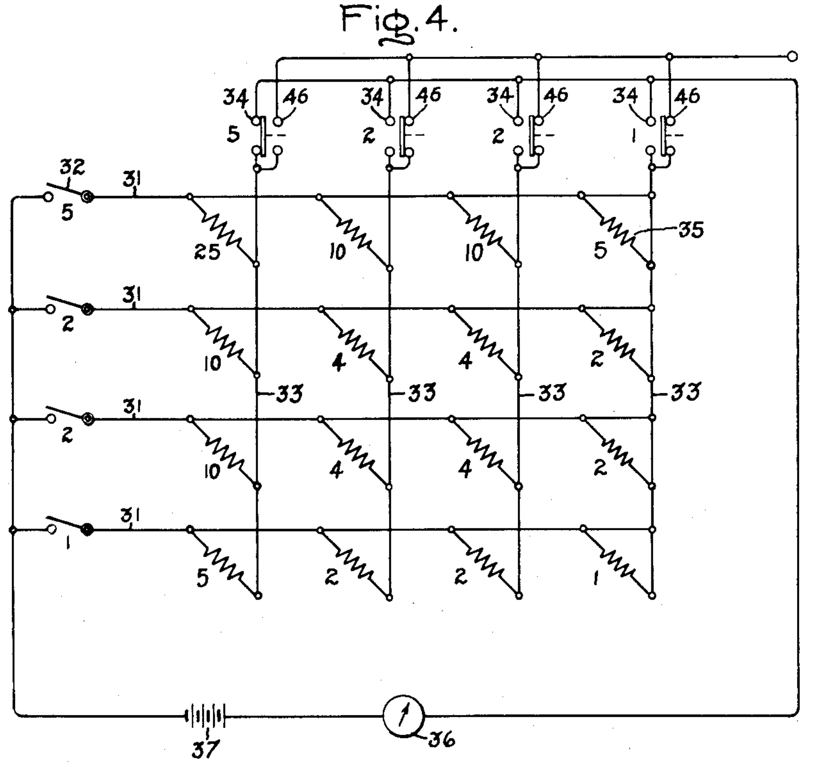
Figure 5:
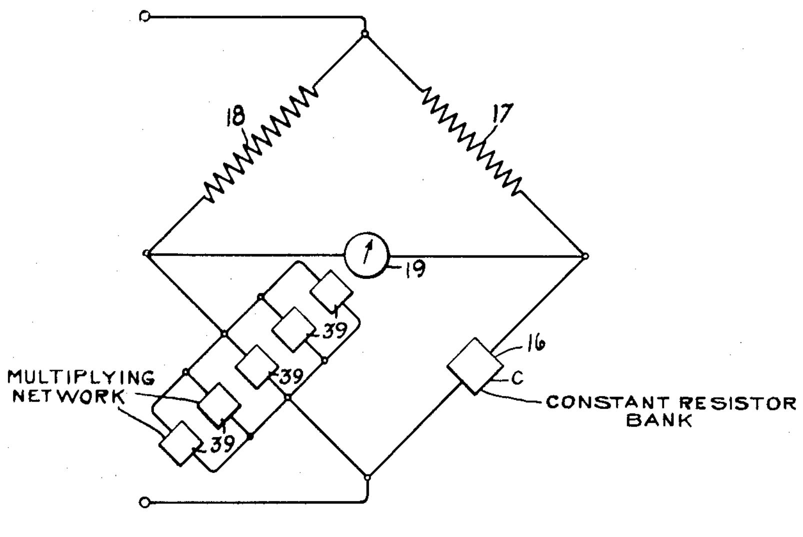
Figure 6:
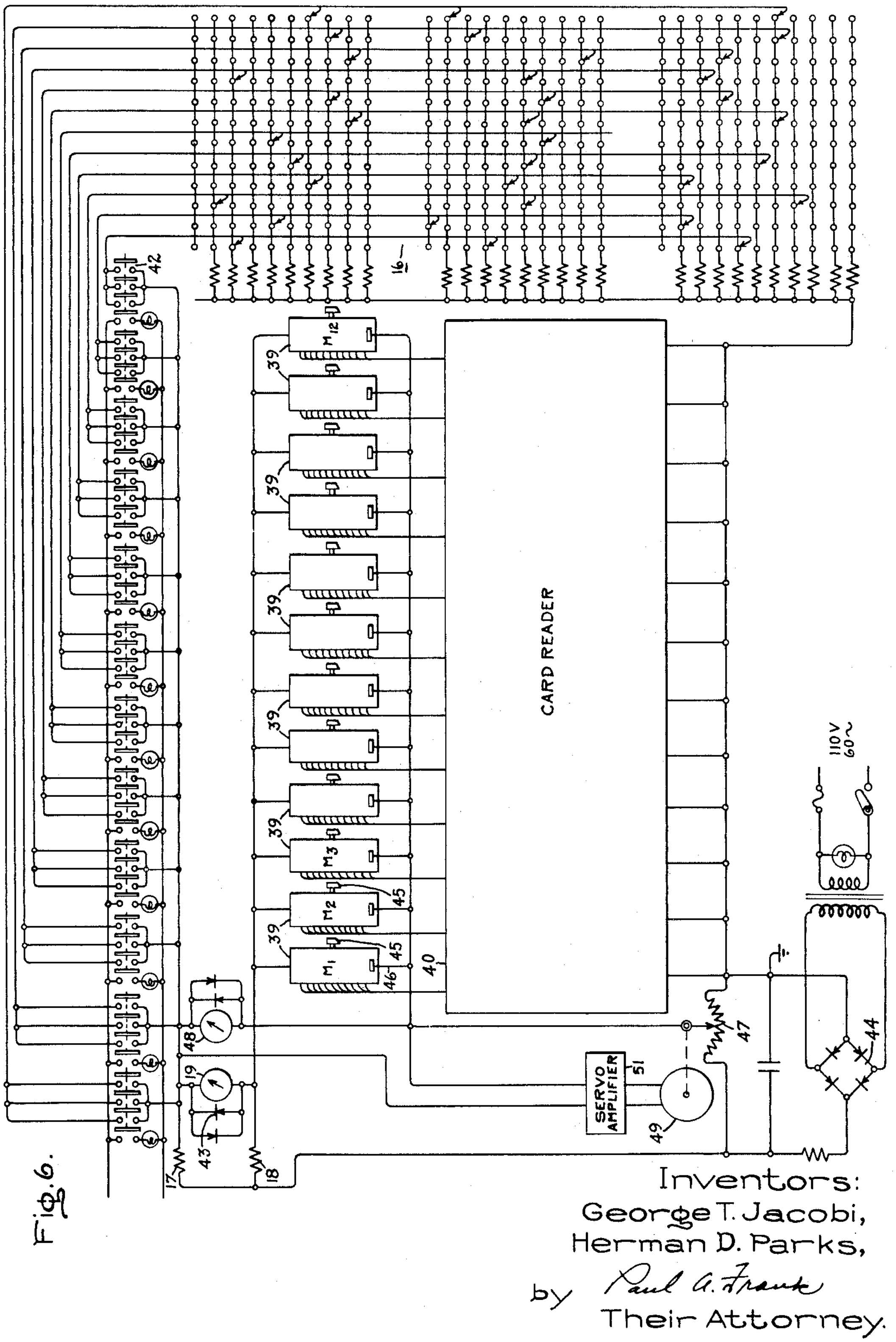

Other objects, features, and many of the attendant advantages of this invention will be appreciated more readily as the same become better understood by reference to the following detailed description when considered in connection with the accompanying drawings, wherein like parts in each of the several figures are identified by the same reference character, and wherein: Fig. 1 is a schematic circuit diagram of a multiplying network that is particularly well suited for use in the computer comprising the present invention; Fig. 2 is a simplified schematic circuit diagram of a new and improved simultaneous linear equation computer incorporating the multiplying network of Fig. 1; Fig. 3 is a schematic circuit diagram of a working model of the form of simultaneous linear equation computer shown in Fig. 2; Fig. 4 is a schematic circuit diagram of a second type of multiplying network designed for use in a second form of linear simultaneous equation computer constructed in accordance with the invention; Fig. 5 is a simplified circuit diagram of the second form of linear simultaneous equation computer incorporating the multiplying network of Fig. 4; and Fig. 6 is a detailed circuit diagram of a practical form of the simultaneous linear equation computer illustrated in Fig. 5 of the drawings.

Almost all electrical computers for solving simultaneous linear equations of the type $$\begin{array}{l} a_{11}X_1+a_{12}X_2+\cdots a_{1n}X_n=C_1 \\ a_{21}X_1+a_{22}X_2+\cdots a_{2n}X_n=C_2 \\ \quad\vdots \\ a_{m1}X_1+a_{m2}X_2+\cdots a_{mn}X_n=C_n \end{array} \qquad (1)$$

utilize a basic iterative scheme, with the iterations in the several equations being performed either simultaneously or in succession. The basic methods employed by the computer comprising the present invention may be broadly classified as (a) iteration on the individual equation error, (b) solution on equation differences, (c) matrix inversion. It can be shown that for sets of simultaneous linear equation satisfying certaing requirements, the system will ultimately come to some stable equilibrium with the unknowns assuming their correct values. These requirements relate to the convergence and symmetry of the equations, and are generally satisfied for equations representing physical conditions. In the method of iteration on individual equation error, the first equation $$a_{11}X_1+a_{12}X_2 \ldots a_{1n}X_n=C_1$$

of the set (1) is fed into the computer by setting the coefficients $a_{11}$, $a_{12}$, . . . $a_{1n}$ to their predetermined values, and approximating the values of the unknowns. The error in the equation is then reduced to zero by manipulating the first unknown value $X_1$. The unknown values existing following this operation are then transferred to the next equation $a_{21}X_1+a_{22}X_2+\ldots a_{2n}X_n=C_2$, and the next unknown $X_2$ manipulated until the error in the equation is reduced to zero. The process is then again repeated with respect to the third, fourth, etc. equations in the set until all of the equations have been treated. The entire set of equations is then again treated in exactly the same manner until such time that it is no longer necessary to adjust the unknowns in order to reduce the error in the equations to zero. The unknowns can then be easily determined from the setting of the unknown controls.

The technique of solution on equation differences employs a basic method known as the "Gauss-Seidel method," and permits large improvement in the accuracy of the technique described in the preceding paragraph. After obtaining a solution by the iteration on individual equation error method described above, the equations are each computed manually or on a desk calculator, and the deviations from the actual constants $C_1, C_2, C_3 \ldots C_n$ are determined. The deviations are then substituted for the constants, and thereafter the technique of iteration on the individual equation error is used. By this means, a new set of solutions is obtained which are the corrections for the unknowns. The number of significant digits in each answer may be approximately doubled by this process, hence greater accuracy is obtained. If still greater accuracy is desired, the method may be applied again and again, and is limited only by the accuracy of the manual computation of the errors.

Consider now the set of equations $$\begin{aligned} b_{11}C_1+b_{12}C_2+\cdots+b_{1n}C_n&=X_1\\ b_{21}C_1+b_{22}C_2+\cdots b_{2n}C_n&=X_2\\ \cdot+\cdot+\cdots&=\cdot\\ b_{m1}C_1+b_{m2}C_2+\cdots b_{mn}C_n&=X_m \end{aligned} \qquad (2)$$

With equations of the form of (2), if the X's are desired, simultaneous solution by either of the above two methods is not necessary. Each equation contains only known quantities on the left-hand side, and the unknown on the right-hand side. Its solution then is a straightforward computation of the sum of the products. The coefficients $b$ of Equation 2 may be obtained from the coefficients $a$ of Equation 1 by a process known as matrix inversion. This mathematical process may be accomplished by solving a set of equations consisting of the coefficient matrix $a$, and a set of constants, all equal to zero except the first, which is set equal to 1. Solution of such a set of equations results in the first column of $b$'s directly, and by repeating the operation with all constants equal to zero except the second, then with all constants equal to zero except the third, and so on, all of the inverse coefficients $b$ can be obtained. The inverse coefficients $b$ can then be readily substituted into a set of equations such as (1) to provide a set such as (2). The resulting set of Equation 2 can then be easily solved by ordinary arithmetical procedure of multiplication and addition.

One embodiment of a simultaneous linear equation computer constructed in accordance with the present invention and capable of performing all three of the above-described operations, is schematically illustrated in Figs. 2 and 3. Fig. 1 discloses a multiplying network for use in the computer of Figs. 2 and 3 and comprises a matrix of inert impedances formed by a plurality of sets $a$, $b$, $c$, and $d$ of series connected resistors 11 having the values of resistance indicated. A first selectively operable electric switch means comprising a plurality of line switches 12 is connected across each set of resistors $a$, $b$, $c$ and $d$, and a second selectively operable switch means comprising a plurality of individual column switches 13 is connected across each individual resistor 11 in the matrix. Corresponding ones of the column switches 13 are interconnected by a mechanical linkage 14 into columns A, B, C, and D so that operation of one of the switches serves to operate all the switches in the column, and each column is assigned a value equal to that of the lowest valued resistor in the column. Hence, column A is assigned a value of 1, column B assigned a value of 2, column C assigned a value of 4, and column D assigned a value of 8. Likewise, line switch $a$ is assigned a value of 8, line switch $b$ a value of 4, line switch $c$ a value of 2, and line switch $d$ a value of 1. By this arrangement, the switches 12 and 13 can be selectively operated in a manner so as to present a resistance across the output terminals of the network whose total ohmic value is proportional to the product of two factors fed into the matrix by means of line switches 12 and column switches 13.

For a more detailed description of the construction and operation of the multiplying network shown in Fig. 1, reference is made to copending patent application Serial Number 323,915, filed December 3, 1952, by Herman D. Parks, and assigned to the same assignee as the present invention. Briefly stated, however, the network operates in the following manner: Consider the multiplication of a number 10 by the number 5. To enter the number 10, line switches $a$ and $c$, whose sum is 10, are opened, leaving line switches $b$ and $d$ closed. This action results in short circuiting the sets of resistors $b$ and $d$ so that they are not included in the final ohmic value of resistance presented at the output terminals of the network. To enter the number 5, the column switches A and C are opened, leaving the column switches B and D closed. This action results in eliminating all of the resistors in column B and D from the final ohmic value of the network. By inspection of the figure, then, it can be seen that only the resistors at the intersections of the column A and C and the lines $a$ and $c$ are included in the final ohmic value of the network, and that the sum of such resistors equals $32+8+8+2=50$ which is the desired product. It can be easily determined that the multiplier will operate in a similar manner on other numbers between 0 and 15, and if expanded to include higher integers, multiplication of higher value numbers could also be achieved in a like manner.

The multiplying network of Fig. 1 is included in a new and improved simultaneous linear equation computer which is schematically illustrated in Fig. 2 of the drawings wherein a plurality of multiplying networks 15 are connected in series electrical circuit relationship in one branch of a Wheatstone bridge circuit. The Wheatstone bridge circuit is further comprised of a variable resistor 16 connected in an adjacent branch of the bridge circuit, and a constant impedance or resistor 17 and 18 is connected in each of the remaining two branches. An indicator 19 is connected across one pair of diagonally opposite terminals of the bridge circuit thus formed, and the entire bridge circuit is energized from a source of electrical power (not shown) connected across the remaining pair of diagonally opposite terminals.

Consider now an equation of the form $$a_{11}X_1+a_{12}X_2+a_{13}X_3+\ldots a_{1n}X_n=C_1$$

which comprises just one equation of the set of simultaneous linear Equations 1 to be solved. The two factors $a_{11}X_1$ of the first term on the left-hand side of the equation are entered in multiplier M1, the two factors $a_{12}X_2$ in the second term is entered in multiplier M2, and so on down the line so that all of the terms on the left-hand side of the equation are in the multipliers. To thus condition the multipliers 15, the coefficients $a_{11}$, $a_{12}$, $a_{13} \ldots a_{1n}$, are known so that these values can be readily entered in the networks. The unknown factors $X_1$, $X_2$, and so on, are unknown, however, and hence must be approximated by inserting arbitrary values for the unknowns which approach a first solution to the equation. The constant $C_1$ is then entered in the variable resistor 16, and the circuit energized. The bridge is then brought to balance by varying the unknown factor $X_1$ in multiplier M1, and upon this occurence the following relation exists $$\frac{A}{a_{11}X_1+a_{12}X_2+\ \cdot\ \cdot\ \cdot\ a_{1n}X_n}=\frac{B}{C_1} \qquad (3)$$

The constant resistors A and B being equal, cancel out, leaving the desired relation $$\frac{1}{a_{11}X_1+a_{12}X_2+\ \cdot\ \cdot\ \cdot\ a_{1n}X_n}=\frac{1}{C_1}$$

or $$a_{11}X_1+a_{12}X_2+\ \cdot\ \cdot\ \cdot\ a_{1n}X_n=C_1$$

In the next step, coefficients $a_{21}$, $a_{22}$, $a_{23}$, and etc., are entered in multiplier M1, M2, etc., along with the factors $X_1$, $X_2$, $X_3$, obtained in the solution of the first equation. The constant $C_2$ is entered in variable resistor 16, and the bridge again brought to balance by varying the factor $X_2$ in multiplier M2. Upon reaching balance, the second equation in the set is satisfied. By following this procedure throughout all the equations in the set, better trial values are obtained, at the end of the series of operations. Subsequent repetition of the method until such time that it is no longer necessary to adjust the X factors in order to achieve balance of the bridge after insertion of different sets of coefficients, results in the solution of the set of equations. The desired unknown values of X can then be determined from the setting of the control dials for entering the unknown X factors in each of the multipliers.

If greater accuracy is required than that obtained with the operation described in the preceding paragraph, the Gauss-Seidel method of solution on equation differences can be used to improve the results.

To do this, the left-hand side of the equation is manually calculated with the unknown values obtained from the iteration on individual equation error operation, and the deviations from constant values of each equation in the set thereby derived. The deviations of each equation are then successively inserted in the constant unit 16 instead of the original constants, and the corresponding coefficient matrix $a_{11}$, $a_{12}$, $a_{13}$ . . . $a_{1n}$, etc., of the equation being operated on, is entered in the multiplying networks M1, M2, etc. The successive iteration steps of the previously described method are then carried out, and result in a set of values which are the corrections to be added to the originally obtained X values. These corrections are added algebraically to the answers obtained in the first described method, and serve greatly to improve the accuracy of the original answer.

Should it be desired to solve a set of equations such as (1) by the matrix inversion method, the coefficients $a$ are fed into the multiplier in the same manner as in the iteration of individual equation error method, and the constant resistor 16 set equal to unity. The bridge is then balanced and results in a solution which is the first inverse coefficient $b_1$ desired. The remainder of the coefficients of the remainder of the equations are then fed into the machine with the constant set equal to successive values of zero, and results in providing the inverse coefficients $b_{21}$, $b_{31}$ . . . $b_{M1}$ of the first column of the inverse matrix. This process is then repeated with the constant set equal successively to the values 0 1 0 0 0, etc. and the process repeated to yield the second column of inverse coefficients $b_{12}$, $b_{22}$, $b_{32}$, $b_{M2}$. The operation is then repeated until such time that the entire inverse matrix is obtained. Having obtained the inverse matrix, its successive values can be fed into the computer network along with the original "$a$" coefficient matrix to provide the solutions desired by the simple arithmetical steps of multiplication and summation.

A practical working arrangement of the computer of Fig. 2, is shown in Fig. 3 of the drawings, wherein it can be seen that a Wheatstone bridge is formed with a plurality of the multiplying networks 15 connected in one branch thereof. The bridge circuit further includes a variable resistor 16 which comprises a bank of different valued resistors, and the two constant and equal resistors 17 and 18. The resistor bank 16 is adapted to be preset to provide any one of the constant values $C_1$, $C_2$, $C_3$, . . . $C_n$, through a push button actuated switch mechanism 20, and the constant resistors thus selected is connectable in the bridge circuit through a plurality of sign selector switches 21. Switches 21 are designed to connect the constant resistor provided by the resistor bank 16 either into the branch of the Wheatstone bridge circuit including multipliers 15, or in the adjacent branch thereof, depending upon the sign of the constant, and for this purpose double-throw switches are provided. The multipliers 15 may be either manually or motor-operated when setting the two factors to be multiplied in any one term. In order to insert the factor due to the constant coefficient, a relay 22 is provided for each multiplier which comprises a part of a card-reading mechanism. The card-reading mechanism is of standard construction and is adapted to read off the "$a$" coefficient values which are punched on a separate card for each equation. Relays 22 are energized from a common bus line through a pair of double-throw switches 23 and 24 for inserting the sign of the coefficient value and of the unknown value. The unknown value is fed into each multiplier 15 by means of a control dial 25 which controls the action of the line switches $a$, $b$, $c$, $d$, for example, of the multiplying network shown in Fig. 1 and which, if desired, may be motor operated and relay controlled. By this construction, upon the bridge network being energized from a source of electric current such as a rectifier bridge 26 having its input terminals connected to a source of alternating current voltage, and its output terminals connected across a pair of diagonally opposite terminals of the computer bridge circuit. To indicate a condition of balance or unbalance, an indicator 27 is connected across the remaining diagonally opposite terminals of the bridge circuit, and an overcurrent protective device such as a selenium rectifier 28 is connected in shunt with the indicator.

In order to place the computer shown in Fig. 3 in operation, each of the constants $C_1$, $C_2$, $C_3$, etc., is first set up in the bank of resistors 16, so that they are readily available when desired. A punch card containing a code for the coefficients of the first equation in the set to be solved is then inserted in the punch card reader, which actuates relay 22 to set the desired coefficient values into each of the multipliers 15. The sign of the coefficient determines the direction to which the switches 23 will be thrown, and this in turn will determine which branch or arm of the bridge circuit the multiplier in question will be connected in. The operation of the sign switch 23 can be better understood by reference to Fig. 2, wherein it can be seen that if the product of the signs of the coefficient and of the unknown is positive, the multiplier in question will be connected in series along with the other multipliers having positive signs in the manner indicated. However, if the product of the signs of the unknown to be multiplied and the coefficient is negative, the sign switches serve to connect the particular multiplier in question in the branch of the bridge circuit containing the constant 16. By examination of the Equation 3, it can be seen that this operation is equivalent to providing the product of the multiplier with a negative sign. Next, the unknown sign switch is adjusted in accordance with the sign of the unknown, and the selector switch 21 actuated to connect in a value of resistance proportional to the first constant $C_1$. An arbitrary value of each of the unknowns is then set into the multiplier by adjustment of the control dial 25 on each multiplier, and the bridge brought to balance by adjusting the control dial of multiplier #1. This action results in improved set of trial values for the unknowns. The first punched card is then removed, and the card containing the coefficients of the second equation is inserted in the card reader, and the second constant $C_2$ selected with selector switch 21. Sign switches 21, 23 and 24 are appropriately adjusted in accordance with the signs of the constant $C_2$, the coefficients of equations and the unknowns, and the bridge circuit energized and brought to balance by manipulation of the control dial of multiplier #2. This process is then again repeated with card #3, card #4, etc., until all of the equations in the set to be solved have been used in approximating the values of the unknown. At the end of this operation, all of the equations are again treated until adjustment of the unknowns is no longer necessary to bring the bridge to balance after changing the values of the coefficients. The setting of the control dials 25 then provides a measure of the value of the unknowns.

From the foregoing description, it can be appreciated that the invention provides a new and improved simultaneous equation computer which is semi-automatic in operation and requires little or no attention on the part of an operator once a problem has been entered into the machine. The computer is capable of solving problems by a number of different mathematical techniques, and is designed in a manner such that the time required to set up problems in the machine is reduced to a minimum. This latter feature is brought about by reason of the fact that the computer employs a punched card switching mechanism for entering the matrix of coefficients of the equations to be solved, and (in view of the fact that in most of the physical problems on which the computer will be used, the coefficient matrices tend to repeat themselves) the punched cards can be filed away and used wherever such a repeat of the coefficients occurs. Because of the step-by-step computation technique utilized in the computer, highly accurate results are obtained in a computer which is of the analog type, and is therefore relatively simple in design. A second embodiment of the invention is disclosed in Figs. 5 and 6 of the drawings wherein a different type of multiplying network is used. The particular multiplying network incorporated in the embodiment of the invention in question, is illustrated in Fig. 4 of the drawings, and is identified as a "shunt multiplying network." The shunt multiplying network comprises a plurality of first parallel conductive terminal strips 31, each having a first selectively operable electric switch 32 connected thereto for inserting one of the factors to be multiplied. The terminal strips 31 run transverse to a plurality of second parallel terminal strips 33 that are electrically insulated from the first terminal strips 31 and intersect the first strips at substantially right angles. Connected to each of the second terminal strips 33 is a second selectively operable electric switch means comprising a switch 34 connected to each of the terminal strips 33, for inserting a second one of the two factors to be multiplied. The terminal strips 31 and 33 are connected together through plurality of resistors 35 which interconnect the terminal strips 31 and terminal strips 33 at each of the intersections thereof, and which form a matrix of inert impedances. The resistors 35 are arranged in a predetermined order, and have mathematically related values of resistance such that for a given excitation potential, the current flow through one of the resistors may be either 2, 4, 5, 10, or 25 times the current flow through another of the resistors. To facilitate explanation of the operation of the network, the values of the conductances of each resistor are indicated adjacent to the resistor and, as can be seen by inspection, the resistor in the upper left-hand corner of the network shown in Fig. 4 conducts at least 25 times as much current as does the resistor in the lower right-hand corner of the network. To measure this current, an indicating device such as 36 may be provided in series with a source of excitation potential 37, and the series circuit thus comprised connected through one of the switches 32 and 34 to the multiplying network. Also, each of the selector switches 32 is assigned the particular value noted adjacent to the switch, and the selector switches 34 are likewise assigned the values indicated. These values are determined from a known arithmetical series, and are related to the values of conductance assigned to each of the resistors 35.

For a more detailed description of the construction and operation of the multiplying network shown in Fig. 4, reference is again made to the above-identified patent application of Herman D. Parks. Briefly however, if both of the switches #5 are closed, only the resistor in the upper left-hand corner of the network conducts, and the ammeter 36 will read 25 units of current. Likewise, any pair of one vertical and one horizontal terminal strip line switch will produce a current proportional to the product of the two switch values, and this current will flow through that resistor common to the two terminal strips switched in. Combinations of switches are extensions of this principle. For example, should it be desired to multiply 8×3, it would be necessary to express these numbers as (5+2−1) and (2+1). To enter these numbers in the multiplying network, the 5, 2, and 1 switches in the vertical terminal strip, and the 2 and 1 switches in the horizontal terminal strip 31 are closed. The value sought is then $$(5+2+1)\times(2+1)=5\times2+5\times1+2\times2+2\times1+1\times2+1\times1=\underline{10+5+4+2+2+1}=24$$

which is exactly the sum of the resistors switched in by this action. It should be noted that the six conductances switched into the circuit are equal to the 6 terms underlined above. While the circuit shown in Fig. 4 is limited of course to multiplying only single integer numbers from 1 to 10, the network can be easily expanded to handle integer values of a higher order from 1 to 100 or 1 to 1000 should it be desired.

A simultaneous linear equation computer incorporating the multiplying network of Fig. 4 as a part thereof, is shown in Fig. 5 of the drawings. The computer illustrated in Fig. 5 comprises a Wheatstone bridge circuit having a plurality of multiplying networks 39 of the type shown in Fig. 4, connected in parallel electrical circuit relationship in one of the branches thereof. In other respects, the computer circuit of Fig. 5 is similar to the computer shown in Fig. 2 of the drawing in that it further includes a variable resistor 16 connected in a branch of the circuit adjacent that branch containing the multipliers 39, and a pair of equal, constant resistors 17 and 18 connected in the remaining two branches. An indicating instrument 19 is connected across diagonally opposite terminals of the bridge circuit thus constructed, for indicating unbalance between the branches thereof, and the circuit is energized from a source of electrical energy (not shown) connected across the remaining diagonally opposite terminals of the bridge.

The operation of the computer shown in Fig. 5 of the drawing is entirely like the operation of the computer shown in Fig. 2 of the drawing with the notable exception that in the computer of Fig. 5, currents are summed in place of impedances or resistance values. Otherwise, the operations are the same in that all coefficients "*a*" of a given equation are entered on respective multipliers, and corresponding trial values for the X's are set on the unknown control dials. Hence, each multiplier 39 will conduct an amount proportional to the product of $A_{nm}X_{mn}$ and the total conductance through the branch of the bridge circuit containing the multipliers will equal the summation of conductances through all of the multipliers. The conductance through this branch will then equal the left-hand side of the equation in question, and the constant resistor 16 is made equal to the right-hand side of the equation.

In order to effect computation of the equations by the technique of matrix inversion, or utilization of Gauss- Seidel method of solution on equation differences, the circuit of Fig. 5 is operated in precisely the same manner as the circuit of Fig. 2. Hence, the description of this operation of the circuit in performing this type of mathematical computation is believed unnecessary.

Fig. 6 discloses a schematic circuit diagram of a practical working arrangement of the computer shown in Fig. 5, and comprises a plurality of multiplying neworks 39 of the type shown in Fig. 4 of the drawings, wherein two separate, selectively operable control switches are provided for entering each of the two factors to be multiplied by the network. One of the control switch means in each of the multipliers 39 is preferably actuated by a card reader mechanism 40 which is of standard construction, and serves to set or read into each of the multipliers 39 the value of the coefficients "*a*" of a particular equation being solved from a storageable card on which the coefficients have been punched. Multipliers 39 are included in a Wheatstone bridge circuit that further includes a variable resistor 16 formed by a bank of different valued resistors designed to provide different constant values of resistance for use as the constants $C_1$, $C_2$, $C_3$, . . . $C_n$, etc., and having an accuracy up to three digits. The resistors of the resistor bank 16 are adapted to be connected into electrical circuit relationship in the Wheatstone bridge circuit through a plurality of push button actuated selector switches 42. The Wheatstone bridge circuit is further comprised by a pair of constant equal resistances 17 and 18, and has an indicator 19 couplied across a pair of diagonally opposite terminals thereof, which is protected by an overcurrent regulator comprising a pair of back-to-back uniconducting elements 43. The bridge circuit thus comprised, is energized from a rectifier bridge 44 having its output terminals connected across the remaining pair of diagonally opposite terminals of the main Wheatston bridge, and having the input terminals thereof coupled across the secondary winding of a transformer energized from a primary source of alternating current energy.

In operation, the values of the coefficients of each equation in the set to be solved are fed into the respective multipliers by card reading relays of the card reading mechanism 40. Arbitrary values for the unknown are likewise fed into the multipliers by adjusting the unknown control dials 45 associated with each multiplying network. The control knob 45 may be manually operated or, if desired, motor operated and relay controlled, the motors in turn being controlled by relays actuated by an error signal derived across the output terminals of the Wheatstone bridge circuit. A value of resistance representing the constant $C_1$ for the first equation in the set is then connected into circuit relationship through selector switch 42 to thereby complete the Wheatstone bridge circuit. The bridge circuit is then brought to balance by adjusting the value of the unkown $X_1$ in the first multiplier 39. Upon completion of this step, the first punched card is removed from the card reading mechanism, the second punched card inserted in its place, and the mechanism adjusted to read into the multiplying network the coefficients of the second equation in the set. Selector bank 42 is actuated to connect in the next value of constant $C_2$ into the bridge circuit and control knob 45 of multiplying network #2 is varied to bring the bridge circuit into balance, thereby resulting in a second improvement of the trial values of the unknowns in the equation. Similar steps are then carried out with respect to the remaining equations in the set and, upon completion of all the steps, solutions for the unknowns can be obtained by reading the settings of the control dials 45. Should it be desired to improve these solutions, the operation can be again repeated a number of times until no adjustment of the unknowns of control knob 45 is required in order to obtain balance of the circuit upon switching in the different coefficients of the equations in the set. Upon reaching this condition, reliable values of the unknowns can be obtained by reading the setting of the dials 45. The operation of the network of Fig. 6 in carrying out the Gauss-Seidel method of solution of equation differences, or the method of computation by matrix inversion, is precisely the same as that of the computer illustrated in Fig. 3 of the drawings. Hence, further description of the use of the computer of Fig. 6 to accomplish solution of the equations by either of the techniques in question is believed unnecessary.

Referring again to Fig. 4 of the drawings, it can be seen that if the values 5 and 5 are to be multiplied together, column switch 5 and line switch 5 should be closed, and the resistor having a conductance value of 25 connected in closed electrical circuit relationship. It can also be noted that a second shunt path can be traced through the network in parallel to that of the desired 25 conductance value resistor. One such path may be traced through the 10, 4 and 10 conductance value resistors, and a number of other such paths can likewise be traced out. Because leakage currents through these shunt paths might tend to throw off the values of current flowing in multiplying network, it is necessary to compensate for their effect. For this purpose, a shunt path compensation means is provided which includes a plurality of electric switches 46 connected to either the first terminal strips, or to the second terminal strips, if desired, in parallel with the switches 34. The selectively operable switches 46 are complementarily operable with respect to their associated switches 34 so that upon the switch 34 being closed, the switch 46 automatically opens, and upon the switch 34 being opened, the switch 46 automatically closes. By this arrangement, compensation voltage may be fed into critical points of the multiplying network so as to compensate or buck out leakage currents through the shunt paths.

The compensating potential is applied through a conductor 46 which, as is best seen in Fig. 6 of the drawings, is connected to the movable contact of a potentiometer 47 connected across the power supply rectifier 44. The movable contact of potentiometer 47 is also electrically connected through an indicating device 48 having over-current protective elements short-circuiting the same to one of the diagonally-opposite terminals of the main Wheatstone bridge circuit in common with indicator 19. The movable contact of potentiometer 47 is also mechanically connected to the shaft of a servo motor 49 which is controlled by a servo amplifier 51. Amplifier 51 has one input terminal thereof connected to the terminal of the main bridge circuit to which indicators 19 and 48 are connected in common, and the remaining input terminal thereof electrically connected to the movable contact of potentiometer 47. By this arrangement, any unbalance of the main bridge circuit due to shunt path current flow is applied across the input of servo amplifier 51, which in turn actuates servo motor 49 to move the movable contact of potentiometer 47 in a manner to compensate or cancel out such current flow by the application of a suitable potential through the complementarily operable switches 46 to the critical points in the multiplying network. An indication of this condition being attained, can be determined from the indicating instrument 48. By this arrangement, then, the advantages of the shunt type multiplier can be incorporated into a simultaneous linear equation computer without greatly complicating its construction, and results in reducing substantially the cost of the overall computer in that the number of switches required by each multiplier is considerably reduced. For example, in the series type computer, the multiplying network for effecting multiplication of integers from 1 to 100 would require approximately 100 switches, while in the shunt-type multiplying network the same operation can be formed with substantially one-tenth the number of switches.

Again summarizing, from the preceding description of the construction and operation of the two embodiments of a simultaneous linear equation computer constructed in accordance with the invention, it can be appreciated that the invention results in providing a computer which can be semi or fully automatic in operation so as to require little or no attention on the part of an operator. It is capable of solving problems by a number of different mathematical computation techniques, and is so designed as to reduce to a minimum the time required to set up problems. The computer is of the analog type, and therefore incorporates the simplicity of design common to such computers, but nevertheless is capable of the accuracy of the digital type computer in that it utilizes step-by-step computation techniques. It provides all of the above advantages, in addition to being relatively flexible in that it can be designed to utilize either a resistance or current analogy. Further, it is relatively simple to construct, and inexpensive to manufacture.

In the light of the present teachings, other modifications and variations of the invention will be suggested to those skilled in the art. It is therefore to be understood that changes may be made herein which are within the full intended scope of the invention as defined by the appended claims.

What we claim as new and desire to secure by Letters Patent of the United States is:

1. An electrical computer comprising a Wheatstone bridge circuit having a multiplying network connected in a first branch thereof, said multiplying network including a matrix of impedances, a variable impedance connected in a second branch of said Wheatstone bridge circuit adjacent to said first branch, a constant impedance connected in each of the remaining branches of the circuit, and an indicator connected across diagonally opposite terminals of said bridge circuit.

2. An electrical computer comprising a Wheatstone bridge circuit having a plurality of multiplying networks connected in a first branch thereof, each said multiplying network including a matrix of impedances, a variable resistor connected in a second branch of said Wheatstone bridge circuit adjacent to said first branch, a constant resistor connected in each of the remaining branches of the circuit, and an indicator connected across diagonally opposite terminals of said bridge circuit.

3. An electrical computer comprising a Wheatstone bridge circuit having a plurality of multiplying networks connected in a first branch thereof, each of said multiplying networks including a matrix of impedances and having first and second control switch means for entering into said matrix the factors to be multiplied with one of the switch means being adapted to be punched card actuated, a variable resistor connected in a second branch of said Wheatstone bridge circuit adjacent to said first branch, a constant resistor connected in each of the remaining branches of the circuit, and an indicator connected across diagonally opposite terminals of said bridge circuit.

4. An electrical computer comprising a Wheatstone bridge circuit having a plurality of multiplying networks connected in a first branch thereof, each of said multiplying networks comprising a matrix of inert impedances, first selectively operable electric switch means for selectively connecting desired combinations of impedances of the matrix into electrical circuit relationship in accordance with one of the factors to be multiplied, and second selectively operable electric switch means for selectively connecting the desired combination of impedances of the matrix into electrical circuit relationship in accordance with a remaining factor to be multiplied, a variable resistor connected in a second branch of said Wheatstone bridge circuit adjacent to said first branch, a constant resistor connected in each of the remaining branches of the circuit, and an indicator connected across diagonally opposite terminals of said bridge circuit.

5. An electrical computer comprising a Wheatstone bridge circuit having a plurality of multiplying networks connected in a first branch thereof, each of said multiplying networks comprising a matrix of inert impedances, first selectively operable electric switch means for selectively connecting desired combinations of impedances of the matrix into electrical circuit relationship in accordance with one of the factors to be multiplied, and second selectively operable electric switch means for selectively connecting the desired combination of impedances of the matrix into electrical circuit relationship in accordance with a remaining factor to be multiplied, a bank of resistors having preselected resistance values and selectively operable switch means for connecting desired ones of the resistors into a second branch of said Wheatstone bridge circuit, said second branch being adjacent to said first branch, a constant resistor connected in each of the remaining branches of the bridge circuit, and an indicator connected across diagonally opposite terminals of said bridge circuit.

6. An electrical computer comprising a Wheatstone bridge circuit having a plurality of multiplying networks connected in a first branch thereof, each of said multiplying networks comprising a plurality of parallel first conductive terminal strips, first electric switch means connected to each of said first strips for inserting one of the factors to be multiplied, a plurality of parallel second conductive terminal strips disposed transversely to and electrically insulated from said second strips, second electric switch means connected to each of said second strips, for inserting a remaining factor to be multiplied, and an impedance interconnecting respective pairs of said first and second strips at the intersection thereof, a variable resistor connected in a second branch of said Wheatstone bridge circuit adjacent to said first branch, a constant resistor connected in each of the remaining branches of the circuit, and an indicator connected across diagonally opposite terminals of said bridge circuit.

7. An electrical computer comprising a Wheatstone bridge circuit having a plurality of multiplying networks connected in a first branch thereof, each of said multiplying networks comprising a plurality of parallel first conductive terminal strips, first electric switch means connected to each of said first strips for inserting one of the factors to be multiplied, a plurality of parallel second conductive terminal strips disposed transversely to and electrically insulated from said second strips, second punched card actuated electric switch means connected to each of said second strips for inserting a remaining factor to be multiplied, and an impedance interconnecting respective pairs of said first and second strips at the intersections thereof, a bank of resistors having preselected resistance values and selectively operable switch means for connecting desired ones of the resistors into a second branch of said Wheatstone bridge circuit, said second branch of the bridge circuit being adjacent to said first branch, a constant resistor connected in each of the remaining branches of the bridge circuit, and an indicator connected across diagonally opposite terminals of the bridge circuit.

8. An electrical computer comprising a Wheatstone bridge circuit having a plurality of multiplying networks connected in a first branch thereof, each of said multiplying networks comprising a plurality of parallel first conductive terminal strips, first electric switch means connected to each of said first strips for inserting one of the factors to be multiplied, a plurality of parallel second conductive terminal strips disposed transversely to and electrically insulated from said second strips, second punched card actuated electric switch means connected to each of said second strips for inserting a remaining factor to be multiplied, and an impedance interconnecting respective pairs of said first and second strips at the intersection thereof, a bank of resistors having preselected resistance values and selectively operable switch means for connecting desired ones of the resistors into a second branch of said Wheatstone bridge circuit, said second branch of the bridge circuit being adjacent to said first branch, a constant resistor connected in each of the remaining branches of the bridge circuit, an indicator connected across diagonally opposite terminals of said bridge circuit, and a shunt path compensation system connected to said bridge circuit, said shunt path compensation system comprising additional electric switch means connected to each of said second terminal strips, said additional electric switch means being complementally operable with respect to said second electric switch means, a potentiometer having the movable contact thereof electrically connected to all of said additional switch means in common, a servo-motor mechanically connected to the movable contact of said potentiometer, a servo-amplifier having the output thereof connected to said servo-motor for controlling the same and having the input thereof connected across one terminal of said bridge circuit and the movable contact of said potentiometer.

9. An electrical computer comprising a Wheatstone bridge circuit having a plurality of multiplying networks connected in a first branch thereof, each of said multiplying networks comprising a plurality of sets of series connected impedances, first selectively operable electric switch means connected across each set of series connected impedances for selectively short circuiting the same in accordance with one of the factors to be multiplied, and second selectively operable electric switch means connected across each impedance of each set for selectively short circuiting desired ones of the impedances in accordance with a remaining factor to be multiplied, related ones of said impedances having the short circuiting switches thereof mechanically interconnected and operable together, a variable resistor connected in a second branch of said Wheatstone bridge circuit adjacent to said first branch, a constant resistor connected in each of the remaining branches of the circuit, and an indicator connected across diagonally opposite terminals of said bridge circuit.

10. An electrical computer comprising a Wheatstone bridge circuit having a plurality of multiplying networks connected in a first branch thereof, each of said multiplying networks comprising a plurality of sets of series connected impedances, first selectively operable electric switch means connected across each set of series connected impedances for selectively short circuiting the same in accordance with one of the factors to be multiplied, and second punched card actuated selectively operable electric switch means connected across each impedance of each set for selectively short circuiting desired ones of the impedances in accordance with a remaining factor to be multiplied, related ones of said impedances having the short circuiting switches thereof mechanically interconnected and operable together, a bank of resistors having preselected resistance values and selectively operable switch means for connecting desired ones of the resistors into a second branch of said Wheatstone bridge circuit, said second branch being adjacent to said first branch, a constant resistor connected in each of the remaining branches of the bridge circuit, and an indicator connected across diagonally opposite terminals of said bridge circuit.

References Cited in the file of this patent

UNITED STATES PATENTS

| | | |
|---|---|---|
| 1,573,850 | Naiman | Feb. 23, 1926 |
| 1,826,762 | Franklin | Oct. 13, 1931 |
| 2,503,387 | Hartwig | Apr. 11, 1950 |